United States Patent [19]

Altemark et al.

[11] Patent Number: 4,659,306

[45] Date of Patent: Apr. 21, 1987

[54] METHOD OF AND SYSTEM FOR DETERMINING THE RATIO BETWEEN THE OXYGEN-CARRYING GAS CONTENT AND THE FUEL CONTENT OF A MIXTURE

[75] Inventors: Detlef Altemark, Dorsten; Manfred Weid, Haltern; Eugen Brockmann, Dorsten, all of Fed. Rep. of Germany

[73] Assignee: Ruhrgas Aktiengesellschaft, Essen, Fed. Rep. of Germany

[21] Appl. No.: 709,696

[22] Filed: Mar. 8, 1985

[30] Foreign Application Priority Data

Mar. 8, 1984 [DE] Fed. Rep. of Germany ....... 3408397

[51] Int. Cl.$^4$ ............................................... F23N 5/00
[52] U.S. Cl. ........................................ 431/12; 431/76; 236/15 E
[58] Field of Search ............... 431/12, 75, 76, 173; 236/15 E; 73/23

[56] References Cited

U.S. PATENT DOCUMENTS

| | | | |
|---|---|---|---|
| 1,639,167 | 8/1927 | Degen | 431/173 |
| 2,780,414 | 2/1957 | DeHeer | 431/12 X |
| 3,049,300 | 8/1962 | Lewis et al. | 236/15 E |
| 3,211,372 | 10/1965 | Hamilton | 236/15 E |
| 3,768,955 | 10/1973 | McLaughlin | 431/12 |
| 4,118,172 | 10/1978 | Noir et al. | 431/12 |
| 4,238,185 | 12/1980 | Watson | 431/76 |
| 4,488,867 | 12/1984 | Beltrami et al. | 431/12 |
| 4,492,559 | 1/1985 | Pocock | 431/12 |
| 4,508,501 | 4/1985 | Kühn | 431/76 X |

FOREIGN PATENT DOCUMENTS

| | | | |
|---|---|---|---|
| 1004670 | 4/1952 | France | 431/173 |
| 2036290 | 6/1980 | United Kingdom . | |

Primary Examiner—Margaret A. Focarino
Attorney, Agent, or Firm—Beall Law Offices

[57] ABSTRACT

For determining the ratio in which two constituents are blended in a mixture comprising an oxygen-carrying gas and a gaseous fuel to be combusted by a primary combustion system, the thermodynamic conditions (composition, pressure, temperature) of the two gases prior to and after blending being variable, a secondary combustion system reacting part of the fuel and part of the oxygen-carrying gas is used as a reference combustion chamber. A mixture reproducibly analogous with the mixture burnt by the primary combustion system is used for reaction in the reference combustion chamber. Combustion in the reference combustion chamber is measured to obtain at least one signal for measuring and controlling the ratio between the two constituents of the mixture burnt by the primary combustion system, the reference combustion chamber allowing the rapid, accurate and reliable determination of the ratio between the gaseous fuel and the oxygen-carrying gas contents of the mixture burnt by the primary combustion system.

41 Claims, 5 Drawing Figures

METHOD OF AND SYSTEM FOR DETERMINING THE RATIO BETWEEN THE OXYGEN-CARRYING GAS CONTENT AND THE FUEL CONTENT OF A MIXTURE

BACKGROUND OF THE INVENTION

1. Field of the Invention

The present invention relates to the measurement and control of combustion processes and, in particular, systems for determining the ratio between the oxygen-carrying gas content and the fuel content of a mixture for combustion by a primary combustion system by means of a secondary combustion system wherein part of said fuel and part of said oxygen-carrying gas are reacted.

By the term "fuel" as used herein, we mean all kinds of fluid fuels, such as gaseous, vaporous or liquid fuels or mixtures thereof.

2. Prior Art

It is standard practice for combustion conditions and the ratio between the oxygen-carrying gas content and the fuel content of a combustible mixture to be determined by an analysis of the composition of the flue gas in the flue system or by the analysis of a flue gas sample taken from the flue system or by measuring the ratio of the oxygen-carrying gas and the fuel flowing to the primary combustion system, the signal thereby obtained may be displayed for adjusting a burner or burners at certain intervals in response to the values displayed. It is also standard practice for controlled stationary systems to be fitted with a transducer for the conversion of said signal into an appropriate signal for input into a controller controlling the ratio in which said oxygen-carrying gas and said fuel are blended by means of appropriate actuators. If the signal obtained by measurement is generated by a probe in the flue system, said signal lags behind any change in the ratio between the oxygen-carrying gas content and the fuel content of the mixture combusted brought about by an adjustment of actuating elements integrated in the lines taking said oxygen-carrying gas and said fuel to the combustion system, said lag depending on the locations of said actuating elements and said probes in said flue system, the size of the space in which said mixture is combusted, oxygen-carrying gas, fuel and flue gas flows, the combustion process itself and other factors. The response of any system used for controlling the ratio between the oxygen-carrying gas content and the fuel content of the mixture to be combusted thereby depends directly on the sum of delays in the control loop being the sum of delay times and time constants of the various system elements referred to. If such delays are long, control system response will accordingly be slow. Such slow control system response may, in particular in the case of fuel-rich combustion tending to cause sooting and in the case of near-stoichiometric combustion be the cause of high energy loss, high pollutant emission or even damage to the combustion system or the charge of an industrial furnace, if disturbances resulting in a change in combustion conditions occur.

Further, the ingress of undesired secondary air blending with the products of combustion may mainly in the case of room-sealed combustion systems falsify the composition of the flue gas measured in the flue system in conventional combustion-controlled application. If the combustion system burns a fuel-lean mixture, the signals obtained from a system measuring flue gas composition may be falsified by uncombusted flue gas constituents. In the case of unflued combustion systems where the products of combustion blend rapidly with tertiary air to be heated, it is practically impossible to determine the primary oxygen share in the mixture combusted by analyzing the flue gas and it is therefore usual in such cases to measure and/or control the flows of oxygen-carrying gas and fuel to the primary combustion system, the effectiveness of such systems depending largely on the fuel used and thereby the knowledge of the properties of said fuel. Further, simple conventional control systems disregard pressure and temperature variations which have an influence on fuel/air blending and on combustion conditions. Although the determination of characteristic uncombusted constituents of the mixture burnt is theoretically a method of determining the ratio between the oxygen-carrying gas content and the fuel content of a mixture which is valid in the case of pre-mixed combustion systems, said method is again associated with the disadvantage of being highly sensitive to variations in the fuel characteristics.

A method of a type similar to that proposed by the present invention and a corresponding system for nozzle-mixing combustion systems are known from U.S. Pat. No. 4118172. Said patent proposes a secondary combustion system connected in parallel to the main combustion system wherein part of the oxygen-carrying gas and part of the fuel are combusted. In the case of the system which is the subject of the above U.S. patent, the fuel/air ratio of the mixture combusted by said secondary combustion system is varied at regular intervals and the maximum flame temperature is measured to determine the fuel/air ratio required for stoichiometric combustion at constant heat input. The fuel/air ratio for the main combustion system being controlled as a function of the fuel/air ratio for stoichiometric combustion in said secondary combustion system. Said secondary combustion system thereby serves as a pilot combustion system for the main combustion system and the process of combustion in said secondary system is disturbed at regular intervals for determining the fuel/air ratio for stoichiometric combustion at constant heat input in said secondary combustion system and for thereby controlling the fuel/air ratio in the mixture for combustion by the main combustion system. The response behaviour of said known system is relatively slow, since prior to a change in the fuel/air ratio for the main combustion system by the control system, several disturbance cycles and control system response cycles in said pilot system will normally pass and heat input must be kept constant. Further, said pilot system is comparatively complex although it is substantially only fit for detecting changes in fuel properties. Finally, said known system does not provide for a correlation between combustion conditions in the main combustion system and in the secondary combustion system.

SUMMARY OF THE INVENTION

It is an object of the present invention to provide for a method and a system of the kind specified hereinabove allowing the rapid highly accurate and reliable measurement and/or control of the ratio between a fuel and an oxygen-carrying gas in a mixture destined for combustion by a combustion system, said method being valid both in the case of pre-mixed combustion systems and in the case of nozzle-mixing combustion systems and being fit for the representation of fuel-rich and fuel-lean combustion by a primary combustion system.

It is another object of the present invention to provide for the computation and output of fuel-related data which may be relevant for the adjustment of said primary combustion system.

The present invention provides for a method of determining the ratio between an oxygen-carrying gas and a fluid fuel in a mixture to be burnt by a primary combustion system, the thermodynamic parameters (such as composition, pressure and temperature) of said oxygen-carrying gas and said fuel before and after blending the constituents of said mixture being variable. Said method provides for a secondary combustion system represented by a reference combustion chamber receiving a mixture of part of said oxygen-carrying gas and part of said fuel, said mixture flown into said reference combustion chamber being reproducibly analogous to the mixture combusted by said primary combustion system. The above mixture for said reference combustion chamber is reacted in said reference combustion chamber. Combustion conditions in said reference combustion chamber are measured to derive at least one signal used for measuring or controlling or measuring and controlling the ratio between the oxygen-carrying gas content and the fuel content of the mixture combusted by said primary combustion system. Unlike prior art discussed hereinabove, said secondary combustion system of the invention represents a reference combustion chamber since combustion conditions in said reference combustion chamber reproducibly correlate with combustion conditions in said primary combustion system.

The method of the present invention allows the simulation of combustion by said primary combustion system in said reference combustion chamber under identical conditions and thereby provides for a very simple correlation between conditions in the primary and the secondary combustion systems. The data obtained by measurement in said reference combustion chamber may be transferred directly to said main combustion system for the representation of primary combustion system measurement or for controlling said primary combustion system, said reference combustion chamber facilitating measurement and being more easily accessible than the flue system of said primary combustion system. Short lines to the measurement system of said reference combustion chamber, short times of reaction and dwell times inside said reference combustion chamber and the possibility of branching lines from the feeder lines of said primary combustion system shorten response and improve response behaviour. Further, the tapping of an unreacted part of the fuel and the oxygen-carrying gas flow or a mixture thereof and the reaction of said parts of said fuel and said oxygen-carrying gas or said part of said mixture in a relatively small reference combustion chamber which may be sealed easily allows a reduction in leakage and in measurement errors to at least negligible levels. The present invention thereby provides for a reduction in components and equipment required and in the complexity of a system for measuring and/or controlling the ratio beween the oxygen-carrying gas content and the fuel content of the mixture combusted by the primary combustion system and minimizes the susceptibility of the components of said system as well as the entire control system or control loop to failures.

The simulation of combustion and thermodynamic conditions in pre-mixed primary combustion systems is facilitated by flowing part of the mixture passing to said primary combustion system across adjustable flow restrictors to said reference combustion chamber. In the case of nozzle-mixing primary combustion systems, parts of the oxygen-carrying gas and the fuel flows to said primary combustion system are passed across adjustable flow restrictors to said reference combustion chamber. Both in the case of pre-mixed and in the case of nozzle-mixing primary combustion systems, temperature and/or pressure variations in the primary combustion system should preferably also cause analogous variations in the reference chamber combustion conditions but may also be accounted for indirectly following measurement of said variations.

The generation of one or several signals for measuring and/or controlling the primary combustion system mixture is preferably achieved by an analysis of the products of reaction in the reference combustion chamber such as by the measurement of the oxygen content and, if desired, the carbon monoxide content or the content of other products of combustion in the reference combustion chamber flue gas. However, it is also possible to pass part of the flue gas flow from the primary combustion system through the reference combustion chamber, said reference combustion chamber then being used as a measuring chamber with the associated advantage that the ratio between the oxygen-carrying gas content and the fuel content of the mixture to said primary combustion system may be determined accurately by the conversion of combustible constituents in said flue gas.

Alternatively, part of the mixture partly reacted in said primary combustion system may be flown into said reference combustion chamber where the reaction may proceed as in said primary combustion system, combustion conditions or the air factor may be determined and measurement at a reference point in said reference combustion chamber protected, for example, from air ingress may be used for controlling the mixture for said primary combustion system.

Said reference combustion chamber may be heated by electric or other means, for igniting said gaseous fuel/oxygen-carrying gas mixture over a wide range of fuel and oxygen-carrying gas contents and combusting the mixture so ignited completely or under conditions reproducibly analogous to conditions in said primary combustion system. For certain applications, the heating means so provided may reasonably be controlled for achieving and/or maintaining a certain temperature in said reference combustion chamber. Ignition, reaction and combustion conditions in said reference combustion chamber may also be influenced by the use of catalysts of the type used for example in plants for the generation of protective or reactive atmosphere.

The system invented for determining the ratio between the oxygen-carrying gas content and the gaseous fuel content of a mixture combusted by a primary combustion system comprises a secondary combustion system operated in parallel to said primary combustion system, part of said fuel and said oxygen-carrying gas or part of the mixture of said fuel and said oxygen-carrying gas being flown to said secondary combustion system where said fuel and said oxygen-carrying gas or said mixture are reacted as well as means for measuring and analyzing combustion conditions in said secondary combustion system. According to the present invention, said secondary combustion system represents a reference combustion chamber correlated with said primary combustion system by the reaction of a mixture reproducibly analogous with the mixture combusted by said primary combustion system. Said reference combustion chamber or at least the lining of said reference combustion chamber consists of a temperature-resistant material which is preferably glass or ceramics.

In a preferred embodiment of the present invention, said reference combustion chamber is connected with a measuring chamber for measuring combustion conditions in said reference combustion chamber, a zirconium dioxide probe and a temperature sensor being integrated in said measuring chamber preferably connected directly to said reference combustion chamber for measuring the oxygen content or the oxygen partial pressure in the products of combustion from said reference combustion chamber.

Said measuring chamber and said reference combustion chamber may be provided with an electric heating coil which may, by way of example, spiral round said reference combustion chamber and said measuring chamber.

In a preferred embodiment of the present invention, the sensors and probes used for measuring combustion conditions in said reference combustion chamber are connected with a data processing system incorporating a computing means for translating the signals derived from the measurement of said combustion conditions into physical quantities, computing properties and generating appropriate signals for displaying measurement data or for inputting into a controller for controlling the mixture for combustion by the primary combustion system. Said computing means may also be designed for calculating characteristics typical of the combustion process which may include the air factor particularly relevant in the case of the combustion of a fuel-lean mixture and the Wobbe number at reference conditions, the Wobbe number at flowing conditions, the higher heating value and lower heating value, the density of the oxygen-carrying gas, the density of the fuel, and the ratio between said two densities. Said computing means may be provided with an appropriate device for inputting fuel data for the very accurate calculation of such characteristics.

Appropriately integrated in a control loop, said computing means may be used as a digital controller for controlling, by way of example, the means used for heating said reference combustion chamber and/or the mixture flowing to the primary combustion system.

The present invention is preferably used in conjunction with a pre-mixed combustion system but may also used with substantially the same advantages in conjunction with nozzle-mixing combustion systems. The system invented may be combined with manual meters for burner adjustment but may also be used as a stationary controller and is suitable both for fuel-lean and for fuel-rich combustion.

DETAILED DESCRIPTION OF THE INVENTION

Figure 1:
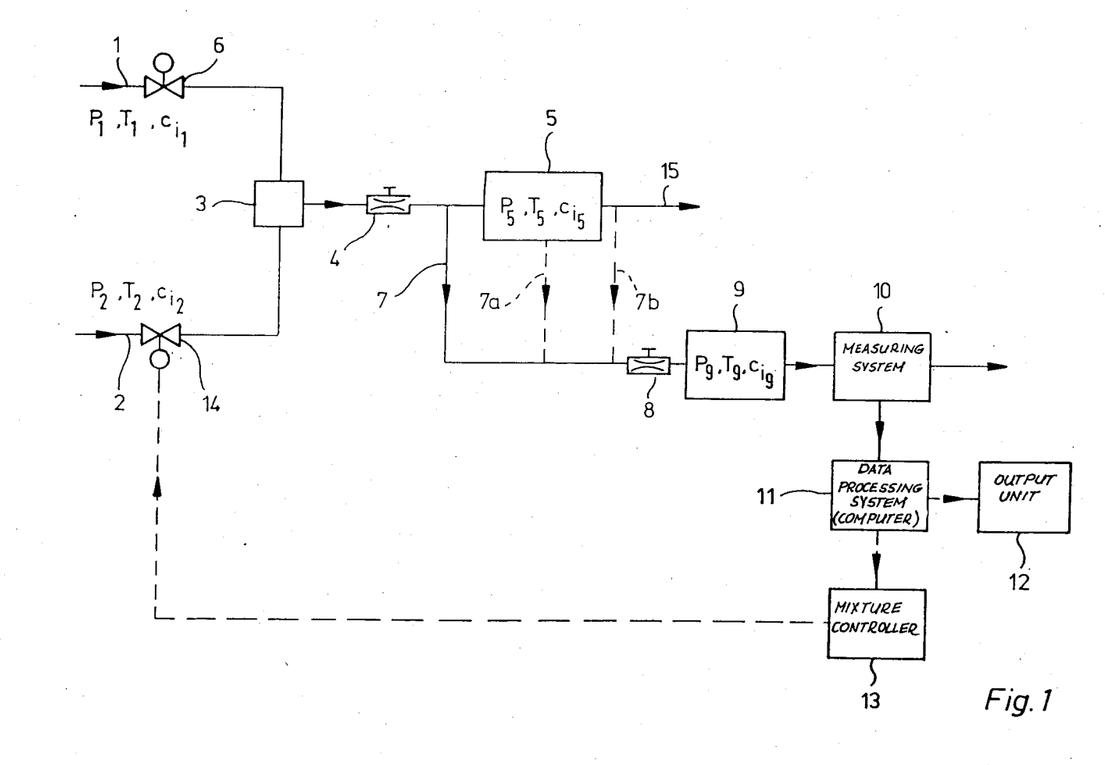
FIG. 1 is a schematic of one embodiment of the system invented in conjunction with a pre-mixed primary combustion system.

Referring first to FIG. 1, the gaseous fuel from line 1 and the oxygen-carrying gas from line 2 are blended by a mixing means 3. The mixture so obtained flows across an adjustable flow restrictor 4 to the primary combustion system 5. Heat input into said primary combustion system 5 is controlled by an adjustable flow restrictor embodied in FIG. 1 by a control valve 6. Before the entry of the mixture obtained by mixing means 3 into the primary combustion system 5, part of said mixture branches into a sample line 7 and flows across an adjustable flow restrictor 8 to a reference combustion chamber 9 where said mixture is combusted completely or in a mode reproducibly analogous with the mode of combustion in primary combustion system 5.

Said reference combustion chamber 9 is associated with measuring means 10 measuring combustion conditions in a reference combustion chamber 9, by way of example, by an analysis of the products of combustion from said reference combustion chamber 9 and generating at least one signal for the measurement and display and/or control of the mixture flowing to the primary combustion system 5, said signal is transmitted to a data processing system 11, incorporating a computing means in the embodiment described by way of reference to FIG. 1. Said computing means calculates characteristics typical of the combustion conditions in reference combustion chamber 9 and transduces said characteristics into signals displayed or otherwise outputted by an output unit 12 or used for input into controller 13 for controlling the mixture flowing to the primary combustion system 5. Said controller 13 may be of the anlog or the digital type and may entirely or partly form part of the computing means incorporated in data processing system 11. The control signal outputted by controller 13 is transmitted to control valve 14 controlling the ratio between the oxygen-carrying gas and the gaseous fuel constituents in the mixture flowing to the primary combustion system 5 by controlling the oxygen-carrying gas flow. In other embodiments of the present invention, heat input into the primary combustion system 5 may be kept constant by the operation of control valve 14, while control valve 6 in the gaseous fuel line 1 is used for controlling the ratio between the oxygen-carrying gas and the gaseous fuel constituents in the mixture flowing to the primary combustion system 5 or valves 6 and 14 may be interconnected by an appropriate system.

The thermodynamic conditions of the oxygen-carrying gas and the gaseous fuel in lines 1 and 2 represented by pressures $p_1$ and $p_2$, temperatures $T_1$ and $T_2$, and concentrations $c_{i1}$ and $c_{i2}$ may vary as the primary combustion system 5 is operated. To simulate combustion conditions in the primary combustion system 5 accurately in reference combustion chamber 9 operated in parallel to primary combustion chamber 5, measures are taken for changes in temperature $T_5$ and/or pressure $p_5$ in the primary combustion system 5 to influence in a reproducible mode, analogous with changes in the primary combustion system 5, combustion conditions in reference combustion chamber 9 characterized by pressure $p_9$ and temperature $T_9$. Said measures may be represented by maintaining pressures $p_5$ and $p_9$ at substantially the same level by introducing the products of combustion from reference combustion chamber 9 in the flue gas line 15 and/or by appropriately heating or cooling reference combustion chamber 9. The measurement of combustion conditions in reference combustion chamber 9 by measuring means 10 is thereby as representative of combustion conditions in the primary combustion system 5 as of combustion conditions in the reference combustion chamber 9, thereby allowing the data derived from the measurement of combustion conditions in the reference combustion chamber 9 to be used for the steady-state control of the primary combustion system 9, the control loop being closed by data processing system 11, controller 13 and valve 14.

In another embodiment of the present invention, part of the mixture partly reacted in the primary combustion system in lieu of uncombusted mixture sampled by sample line 7, is tapped at an appropriate point from said primary combustion system 5 and taken through sample line 7a and across an adjustable flow restrictor 8 to reference combustion chamber 9. In yet another embodiment of the present invention, part of the flue gas from the primary combustion system 5 is tapped from flue gas line 15 and taken through sample line 7b and across the adjustable flow restrictor 8 to the reference combustion chamber 9. An adjustment of flow restrictor 8 would vary sample flow and thereby the time for which the sample is retained in reference combustion chamber 9.

Figure 2:
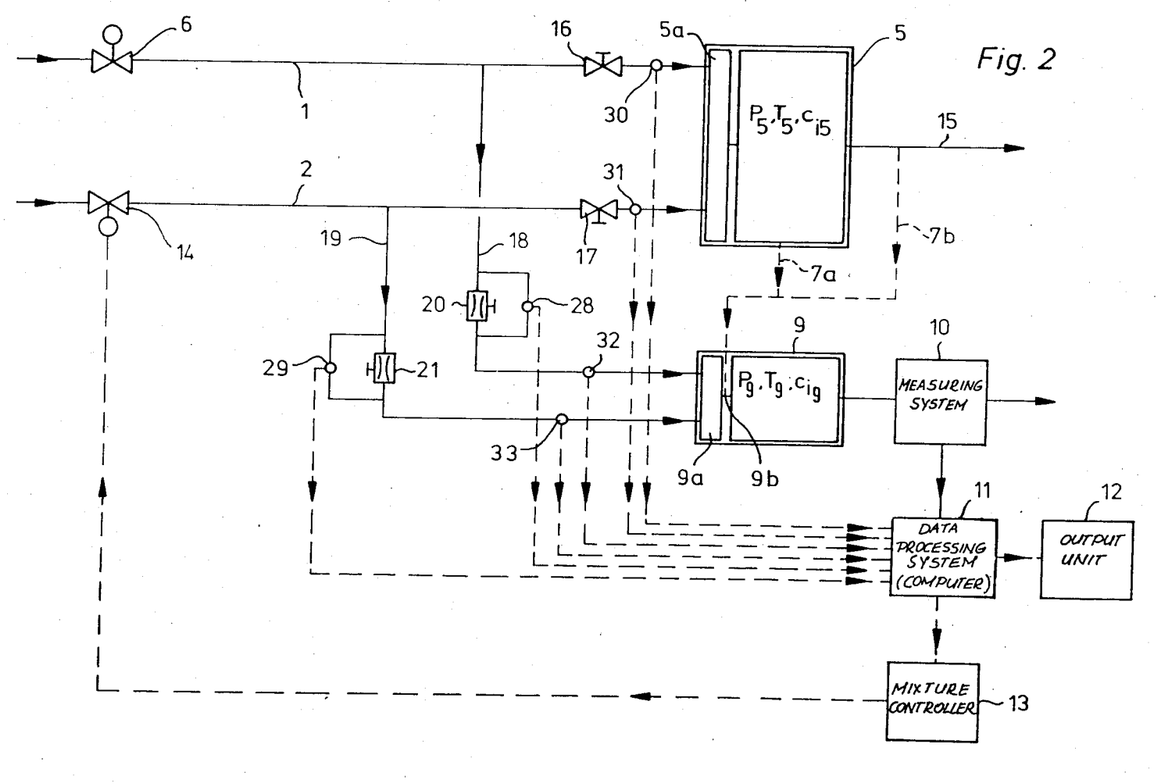
FIG. 2 is a schematic of a modified embodiment of the invention in conjunction with a nozzle-mixing primary combustion system.

FIG. 2 shows a nozzle-mixing combustion system. The gaseous fuel is taken by line 1 and the oxygen-carrying gas is taken by line 2 across valves 6 and 14 respectively and across flow restrictors 16 and 17 respectively to primary combustion system 5 provided with nozzle-mixing means 5a. Samples from lines 1 and 2 flow through sample lines 18 and 19 respectively and are taken across adjustable flow restrictors 20 and 21 respectively to reference combustion chamber 9. The mixing means 9a upstream of reference combustion chamber 9 may either be a nozzle-mixing means similar to nozzle-mixing means 5a of the primary combustion system 5 or an independent mixer. Combustion conditions in reference combustion chamber 9 and the signals obtained from said measurement may be used for measuring or controlling the ratio in which flows through lines 1 and 2 are blended in a manner substantially similar to the manner described in the detailed discussion of FIG. 1 representing a pre-mixed primary combustion system. As in the case of the pre-mixed primary combustion system shown by FIG. 1, samples may also be taken through sample line 7a or 7b, the sample being introduced into reference combustion chamber 9 at an appropriate point 9b downstream of mixing means 9a.

Appropriate measures are taken for simulation, in order to influence combustion conditions in reference combustion chamber 9 characterized by pressure $p_9$ and temperature $T_9$ in a mode reproducibly analogous with changes in the pressure $p_5$ and/or the temperature $T_5$ in the primary combustion system 5. In the embodiment shown schematically by FIG. 2, temperatures are, therefore, measured at points 30, 31, 32 and 33, and the temperature data so obtained are acquired by data processing means 11 and processed by the computer integrated in said data processing means 11. For the purpose of said simulation, the temperature at points 30 and 31 or at points 32 and 33 may be equalized in lieu of measuring the temperatures at points 30, 31, 32 and 33.

In the case of a nozzle-mixing primary combustion system, unlike the case of a pre-mixed primary combustion system, it is not only necessary to simulate combustion, but mixing must also be simulated. Whereas pressure variations in lines 1 and 2 vary combustion conditions in reference combustion chamber 9, differences in temperature changes at flow restrictors 16 and 17 as well as 20 and 21 or at points 30 and 31 as well as 32 and 33 would affect the ratio between the oxygen-carrying gas content and the gaseous fuel content of the mixture flowing to the primary combustion system 5 and the reference combustion chamber 9 respectively.

Further fuel properties may be determined by measuring certain additional values in reference combustion chamber 9 using the equation for the air factor λ correlating by function $f\alpha$ the theoretical air requirement 1$^{st}$ and the higher heating value at normal conditions $H_{\alpha,n}$ ($\alpha=0$) and the lower heating value at normal conditions $H_{\alpha,n}$ ($\alpha=u$) for computing the higher heating value at normal conditions, the lower heating value at normal conditions, the higher heating value at flowing conditions, the lower heating value at flowing conditions and the higher and the lower Wobbe number at normal and at flowing conditions, the correlation being $$H_{\alpha,n} = f\alpha \left[ \frac{1}{\lambda(c_{i9})} \cdot \frac{\dot{N}_{O2}}{\dot{N}_b} \right]$$

where $\dot{N}_{O2}/\dot{N}_b$ represents the ratio between the oxygen-carrying gas mass rate of flow to the reference combustion chamber 9 and the gaseous fuel mass rate of flow to the reference combustion chamber 9 and $\lambda(c_{i9})$ represents the air factor computed from the flue gas composition. Said air factor may be computed by known methods from the shares of the various products of combustion in said flue gas. If the mixture burnt is a fuel-lean mixture, the determination of one inert flue gas constituent is sufficient for computing said air factor, the oxygen content of the flue gas being preferably used for said computation. If said determination of the oxygen content of the flue gas is to be accurate, the oxygen-carrying gas must, however, be dried or the moisture in said oxygen-carrying gas must be measured and accounted for in said computation. Further fuel properties may be computed if the pressure and the temperature of the fuel mass rate of flow to the reference combustion chamber 9 or, in addition, the densities of the oxygen-carrying gas and the gaseous fuel or the ratio between said densities are measured and determined and appropriate equations are used for computing the appropriate fuel properties. For determining the higher heating value and the lower heating value at flowing conditions, by way of example, it is necessary to measure the gaseous fuel temperature at point 32 and the gaseous fuel pressure. It is, however, essential that temperatures and pressures are measured at the appropriate flow restrictors. If the densities of the gaseous fuel and the oxygen-carrying gas and the ratio between said densities are also measured, the lower and the higher Wobbe number at reference conditions and at flowing conditions may also be determined.

The mass rates of flow required for computing the higher heating value or the lower heating value at reference conditions cannot easily be measured directly, said rates of flow therefore being frequently determined indirectly by known flow formulae used for flow measurement by the pressure difference method. Using such an indirect approach, the higher and the lower Wobbe numbers at reference conditions and at flowing conditions may be computed by the computer incorporated in data processing means 11 from the unrestricted cross sections of the flow restrictors 20 and 21, the pressure drops across said flow restrictors 20 and 21, the absolute pressures at points 28 and 29 and the temperatures at points 32 and 33, using the air factor $\lambda(c_{i9})$. If, in addition, the density of the oxygen-carrying gas and the density of the gaseous fuel or the ratio between said densities are also determined, the computer of data processing means 11 may also be used for calculating the higher heating value and the lower heating value at reference conditions and the higher heating value and the lower heating value at flowing conditions by using the appropriate equations.

The computation of fuel properties described hereinabove may be simplified and measurement requirements may be reduced without interfering with the simulation of the primary combustion system 5 by the reference combustion chamber 9, by way of example, by keeping constant or by keeping constant for the time of measurement, the ratio between the temperatures at points 32 and 33, e.g. by heat exchange, and/or the ratio of the pressure drops across flow restrictors 20 and 21 and/or the pressures at points 28 and 29. Factors so kept constant for the time of measurement may be inputted as constant in the computer forming part of data processing means 11 and do not need to be measured.

Figure 3A:
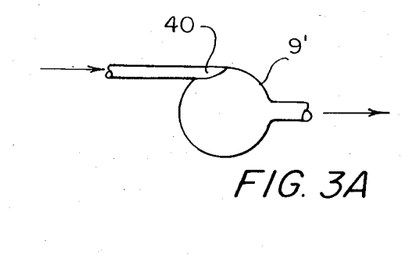
FIGS. 3A and 3B are schematics of two embodiments of the reference combustion chamber forming part of the system invented and FIG. 4 is a schematic of another embodiment of the reference combustion chamber forming part of the present invention heated by electric means, said reference combustion chamber and a directly connected measuring chamber being housed in the same common body provided with thermal insulation means, a zirconium dioxide probe and a thermocouple being inserted in said measuring chamber.
Figure 3B:
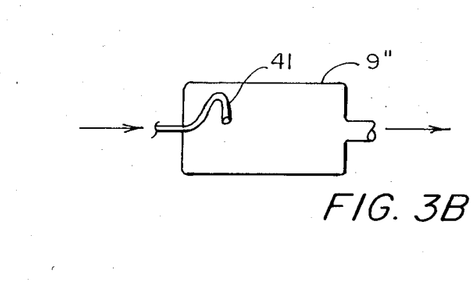

FIGS. 3A and 3B show two preferred embodiments of reference combustion chamber 9, said reference combustion chamber or the lining thereof consisting of a temperature-resistant material, said material being preferably glass or a ceramic material. Reference combustion chamber 9' shown by FIG. 3A is connected with a mixture inlet 40 opening in a substantially tangential mode into said spherical reference combustion chamber 9' and designed for the tangential injection of said mixture into said reference combustion chamber 9'. The shape of reference combustion chamber 9", shown by FIG. 3B is substantially cylindrical, mixture inlet 41 being designed and arranged for the mixture to spiral and to swirl as it enters reference combustion chamber 9".

Figure 4:
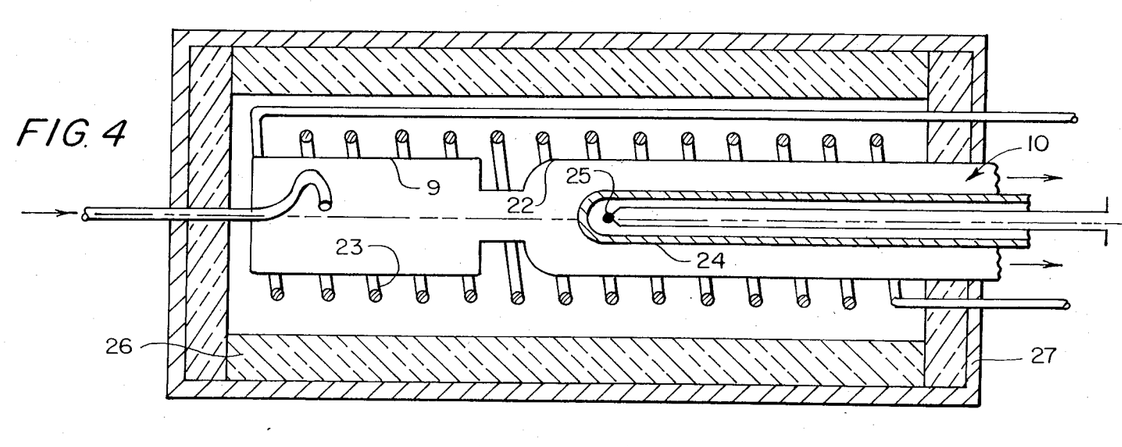

FIG. 4 shows an embodiment of the present invention combining the reference combustion chamber 9 and the measuring means 10 in a common body, said measuring means 10 being provided with a measuring chamber 22 connected directly with reference combustion chamber 9 and heated, together with reference combustion chamber 9, by heating coil 23. A zirconium dioxide probe 24 provided with a thermocouple 25 enter said measuring chamber 22, said thermocouple 25 being used both for the measurement of the flue gas oxygen content by means of said zirconium dioxide probe 24 and for controlling the temperature in reference combustion chamber 9 and measuring means 10 by means of heating coil 23. The entire system shown by FIG. 4 is surrounded by thermal insulation means 26 and body 27.

Thus, in conjunction with a pre-mixed or a nozzle-mixing combustion system, the present invention describes a reference combustion chamber for the analog simulation or the transfer of combustion conditions in said combustion system, the measurement of combustion conditions in said reference combustion chamber being substantially independent of the restrictions of the primary combustion system and for that reason easy to carry out. The information obtained by said measurement of combustion conditions in said reference combustion chamber is transferable to said primary combustion system and may be used for primary combustion system control.

While the invention has been described with reference to a gaseous fuel preferably used in combustion systems, it should be understood that the teachings of the invention are likewise applicable to other fuel fluids, such as vaporous or liquid fluids or mixtures thereof.

We claim:

1. A method of determining the ratio between the constituents of a mixture comprising oxygen-carrying gas and a fuel, said mixture being intended for combustion by a primary combustion system, the thermodynamic parameters such as composition, temperature and pressure of the constituents of said mixture prior to and after blending said constituents being variable, said method comprising the steps of providing a secondary combustion system including a reference combustion chamber, flowing into said reference combustion chamber a mixture comprising part of said oxygen-carrying gas and part of said fuel, said mixture flowing into said reference combustion chamber being reproducibly analogous with the mixture for combustion by said primary combustion system, reacting said mixture in said reference combustion chamber, measuring combustion conditions in said reference combustion chamber and deriving from the data so measured at least one signal for measuring and/or controlling the ratio between said oxygen-carrying gas and said fuel constituents in the mixture for combustion by said primary combustion system.

2. A method according to claim 1, wherein combustion and thermodynamic conditions in said primary combustion system are simulated or reproduced in said reference combustion chamber.

3. A method according to claim 1, wherein said at least one signal for measuring and/or controlling the ratio between said oxygen-carrying gas and said fuel constituents in the mixture for combustion by said primary combustion system is derived from the products of the reaction in said reference combustion chamber.

4. A method according to claim 3, wherein part of the mixture at least partly reacted in said primary combustion system is passed through said reference combustion chamber and combustion conditions in said reference combustion chamber are measured for deriving at least one signal for measuring and/or controlling the ratio between said oxygen-carrying gas and said fuel constituents in the mixture for combustion by said primary combustion system.

5. A method according to claim 3, wherein said at least one signal is derived from the measurement of parameters selected from the group consisting of the oxygen content and the oxygen partial pressure and the content and the partial pressure of an inert constituent, such as carbon dioxide, water and nitrogen, in the products of combustion in said reference combustion chamber.

6. A method according to claim 5, wherein said at least one signal is derived additionally in response to the carbon monoxide content or the carbon monoxide partial pressure or the content or the partial pressure of another uncombusted constituent or several uncombusted constituents such as hydrogen or a hydrocarbon compound in said products of combustion in said reference combustion chamber.

7. A method according to claim 1, wherein combustion conditions in said reference combustion chamber are controlled as a predetermined function of temperature and/or pressure variations in said primary combustion system.

8. A method according to claim 7, wherein said reference combustion chamber is heated, thereby igniting said mixture in said reference combustion chamber over a wide range of compositions and reacting said mixture completely or in a mode reproducibly analogous to the reaction in said primary combustion system, the various products of combustion being in equilibrium as determined by pressure and temperature.

9. A method according to claim 8, wherein reference combustion chamber heating is controlled for a given temperature to be reached and/or maintained in said reference combustion chamber.

10. A method according to claim 1, wherein part of the mixture flowing to a pre-mixed primary combustion system is flown to said reference combustion chamber directly across an adjustable flow restrictor.

11. A method according to claim 1, wherein part of the oxygen-carrying gas and part of the fuel flowing to a nozzle-mixing primary combustion system is flown to said reference combustion chamber across adjustable flow restrictors.

12. A method according to claim 11 wherein the pressure drops across said flow restrictors or the ratio between the pressure drops across said flow restrictors are measured and/or controlled.

13. A method according to claim 1, wherein the mixture in said reference combustion chamber is reacted by catalytic means.

14. A method according to claim 1, wherein the flow of mixture to said reference combustion chamber and thereby the time of retention of the products of combuston in said reference combustion chamber are substantially kept constant.

15. A method according to claim 1, wherein the oxygen-carrying gas is dried.

16. A method according to claim 1, wherein any signal derived from the measurement of combustion conditions in said reference combustion chamber is tranduced into a physical quantity, characteristic data are computed and transduced into appropriate signals which are displayed and/or outputted as measurement data and/or used for input into a controller means for controlling the ratio between said oxygen-carrying gas and said fuel constituents in the mixture for combustion by said primary combustion system.

17. A method according to claim 1, wherein the fuel/air ratio of the mixture flowing to said primary combustion system is computed by a computing means from the measurement of products of combustion in said reference combustion chamber.

18. A method according to claim 17, wherein the fuel/air ratio of the mixture flowing to said primary combustion system is computed by a computing means from the measurement of the oxygen content or the oxygen partial pressure or the content or the partial pressure of an inert constituent in the products of combustion in said reference combustion chamber.

19. A method according to claim 1 further comprising the steps of:

measuring the oxygen-carrying gas flow rate and the fuel flow rate to said reference combustion chamber or the ratio between said two flow rates to said reference combustion chamber, analyzing the composition of flue gas from said reference combustion chamber and computing the higher heating value at reference conditions and/or the lower heating value at reference conditions by a computing means from said fuel/air ratio.

20. A method according to claim 19, comprising the additional step of measuring the pressure and the temperature of said fuel flowing to said reference combustion chamber for computing, by a computing means, the higher heating value at flowing conditions and/or the lower heating value at flowing conditions.

21. A method according to claim 20, wherein the densities or the specific gravities of said oxygen-carrying gas and said fuel are also measured and the lower and/or the higher Wobbe number at reference conditions and/or the lower and/or the higher Wobbe number at flowing conditions are also computed by a computing means.

22. A method according to claim 19, wherein said step of measuring said oxygen-carrying gas flow rate and said fuel flow rate to said reference combustion chamber comprises the provision of flow restrictors in the lines carrying said oxygen-carrying gas and said fuel to said reference combustion chamber, the determination of the ratio between the cross sections of the areas left unrestricted by said flow restrictors and the pressure differences across said flow restrictors and the input of the values so determined into a computing means, said method further comprising the measurement of the temperature and the pressure of said oxygen-carrying gas and said fuel flowing to said reference combustion chamber and the computation of the lower and/or higher Wobbe number at reference conditions and/or the lower and/or higher Wobbe number at flowing conditions.

23. A method according to claim 19, wherein the temperatures and the pressures or the ratios between the temperatures and the pressures of said oxygen-carrying gas and said fuel flowing to said reference combustion chamber are kept constant and/or variations in any of said temperatures, pressures or ratios are adjusted for by appropriate variations in the flow rates of said oxygen-carrying gas and of said fuel flowing to said reference combustion chamber.

24. A method according to claim 21, wherein the ratio of pressure drops across flow restrictors provided in the oxygen-carrying gas and the fuel lines to said reference combustion chamber or the pressure drops across said flow restrictors are substantially kept constant for determining the ratio between the density of said oxygen-carrying gas and the density of said gaseous fuel.

25. A method according to claim 21, wherein the ratio between the temperature of said oxygen-carrying gas and the temperature of said fuel or the temperature of said oxygen-carrying gas and the temperature of said fuel are substantially kept constant for the determination of the ratio between the density of said oxygen-carrying gas and the density of said fuel.

26. A method according to claim 16, comprising the input of fuel properties into a computing means for computing data characterizing the combustion process.

27. A combustion system for determining the ratio between the constituents of a mixture comprising oxygen-carrying gas and a fuel, said mixture being intended for combustion by a primary combustion system, the thermodynamic parameters such as composition, temperature and pressure of the constituents of said mixture prior to and after blending said constituents being variable, comprising:
 means for supplying said mixture to said primary combustion system;
 said primary combustion system having a primary combustion chamber and means for burning the mixture in said primary combustion chamber;
 a secondary combustion system including a reference combustion chamber;
 said reference combustion chamber being fluid connected in parallel with said primary combustion chamber;
 means for flowing into said reference combustion chamber a mixture comprising part of said oxygen-carrying gas and part of said fuel so that said mixture flowing into said reference combustion chamber is reproducibly analogous with the mixture for combustion by said primary combustion means;
 means for reacting said mixture in said reference combustion chamber;
 means for measuring combustion conditions in said reference combustion chamber and providing correlated data;
 means for deriving at least one signal from the data from said means for measuring combustion conditions; and
 means for controlling the ratio between said oxygen-carrying gas and said fuel constituents in the mixture for combustion by said primary combustion system in accordance with said at least one signal from said means for deriving.

28. A system according to claim 27, wherein said reference combustion chamber is lined by a temperature-resistant material said material being preferably glass or ceramics.

29. A system according to claim 27, wherein said reference combustion chamber is substantially spherical and wherein means are provided for the substantially tangential injection of the mixture into said reference combustion chamber.

30. A system according to claim 27, wherein said reference combustion chamber is substantially cylindrical and wherein means are provided for the substantially tangential or spiral injection of the mixture into said reference combustion chamber.

31. A system according to claim 27, wherein a measuring chamber for measuring combustion conditions in said reference combustion chamber is connected with said reference combustion chamber.

32. A system according to claim 31, wherein a zirconium dioxide probe and a temperature sensor are incorporated in said measuring chamber for determining the oxygen content or the oxygen partial pressure in said measuring chamber.

33. A system according to claim 31, wherein said measuring chamber and said reference combustion chamber are provided with a common heating means surrounded by common thermal insulation means and integrated in a common body.

34. A system according to claim 33, wherein said heating means is an electric heating coil spiralling around said reference combustion chamber and said measuring chamber.

35. A system according to claim 34, wherein said electric heating means is directly applied to said reference combustion chamber by thick-film or similar techniques.

36. A system according to claim 33, wherein said reference combustion chamber is used for the conduction of heat for temperature control.

37. A system according to claim 27, wherein, in conjunction with a pre-mixed primary combustion system, a sample gas line is branched from the line connecting a mixing means for blending said oxygen-carrying gas and said fuel and said primary combustion system to flow part of the mixture passing through said line across an adjustable flow restrictor directly to said reference combustion chamber.

38. A system according to claim 29, wherein, in conjunction with a nozzle-mixing primary combustion system, a sample gas line is branched from the line taking said oxygen-carrying gas and a second sample line is branched from the line taking said fuel to said primary combustion system to take part of said oxygen-carrying gas and part of said fuel across adjustable flow restrictors and a mixing means to said reference combustion chamber.

39. A system according to claim 38, wherein said mixing means connected with said reference combustion chamber is analogous to said nozzle-mixing primary combustion system.

40. A system according to claim 27, wherein at least one sample line is provided for taking part of the flue gas from the flue gas system of said primary combustion system and/or part of a mixture partly reacted in said primary combustion system from a certain point in said primary combustion system to said reference combustion chamber across an adjustable flow restrictor.

41. A system according to claim 27, further comprising a measuring means for measuring combustion conditions in said reference combustion chamber and a data processing system including a computing means connected therewith, said computing means being designed and arranged to compute physical quantities from the signals derived from measurements by said measuring means, computing properties and data and converting said properties and data into appropriate signals for display by display means and/or printout by printout means or input into a controller for controlling the mixture flowing to said primary combustion system.

* * * * *